United States Patent [19]

Suzuki et al.

[11] 4,299,738

[45] Nov. 10, 1981

[54] DETERGENT COMPOSITION

[75] Inventors: Hiroshi Suzuki, Mitaka; Hideo Narasaki, Tokyo; Sigeru Seki, Urawa; Kiichi Endo, Iwaki; Takao Hirose, Ichikawa, all of Japan

[73] Assignees: Director-General of Agency of Industrial Science and Technology; Kureha Chemical Industry Co. Ltd.; Sumitomo Corporation, all of Tokyo, Japan

[21] Appl. No.: 969,489

[22] Filed: Dec. 14, 1978

[30] Foreign Application Priority Data

Dec. 18, 1977 [JP] Japan .............................. 52/152127

[51] Int. Cl.³ ........................ C11D 3/12; C11D 3/26; C01B 33/28; C02F 1/42

[52] U.S. Cl. .................................. 252/541; 252/89.1; 252/135; 252/140; 252/155; 252/174.25; 252/179; 252/523; 252/532; 252/539; 252/551; 252/558

[58] Field of Search ............... 252/131, 135, 140, 155, 252/174.25, 179, 523, 541, 89.1

[56] References Cited

U.S. PATENT DOCUMENTS

| | | | |
|---|---|---|---|
| 4,083,793 | 4/1978 | Jakobi | 252/99 |
| 4,088,611 | 5/1978 | Suzuki | 252/541 |
| 4,148,742 | 4/1979 | Crutchfield | 252/102 |
| 4,203,873 | 5/1980 | Suzuki | 252/545 |
| 4,233,173 | 11/1980 | Mayer | 252/102 |

FOREIGN PATENT DOCUMENTS

| | | | |
|---|---|---|---|
| 7406306 | 11/1974 | Netherlands | 252/174.25 |
| 1473201 | 5/1977 | United Kingdom | 252/174.25 |

*Primary Examiner*—Dennis L. Albrecht

[57] ABSTRACT

A detergent composition possessing low toxicity and excellent washing power which comprises an anionic and/or nonionic surfactant having incorporated thereinto an imido-bis-sulfate and an aluminosilicate.

2 Claims, 5 Drawing Figures

DETERGENT COMPOSITION

FIELD OF THE INVENTION

This invention relates to a new detergent composition comprising an anionic and/or nonionic surfactant (surface active agent) in combination with an imido-bis-sulfate and an aluminosilicate as builders.

BACKGROUND OF THE INVENTION

A builder is generally defined as a substance which has an effect of increasing the surface activity of a surfactant and enhancing its powder characteristics when mixed with the surfactant, and is required to be excellent in such properties as washing power, chelating effect, dispersibility, emulsifying effect, stability to hard water, anti-corrosive effect and economical factor and devoid of any cause to environmental pollution. Examples of builders known from the past include various phosphates besides sodium tripolyphosphate, sodium metasilicate, Glauber's salt and sodium carbonate. However, none of them satisfies all of the requisites above mentioned. Accordingly, it can hardly be said that a builder which is fully satisfactory for practical purposes has been developed. For example, the use of phosphates involves a problem in disposal of waste water, while a common type of silicate has a poor stability to hard water and Glauber's salt is inferior, although it is cheap, in the inherent performance as builder. Among them, the phosphates are used widely for practical purposes by virtue of their excellent inherent performance as builder, such as higher washing power. However, the use of the phosphates involves problems in disposal of waste water and of toxicity. In the field of detergents, therefore, there is a great demand for developing a builder which is excellent in the inherent performance as builder and involves no problem in disposal of waste water and in toxicity.

BRIEF SUMMARY OF THE INVENTION

It is a prime object of the present invention to provide a detergent composition possessing excellent washing power and low toxicity.

It is another object of the present invention to provide a detergent composition with excellent washing power which contains a mixed builder free of phosphorus.

Other and further objects, features and advantages of the present invention will become obvious more fully on understanding of the illustrative embodiments about to be described.

DETAILED DESCRIPTION OF THE INVENTION

Figure 1:
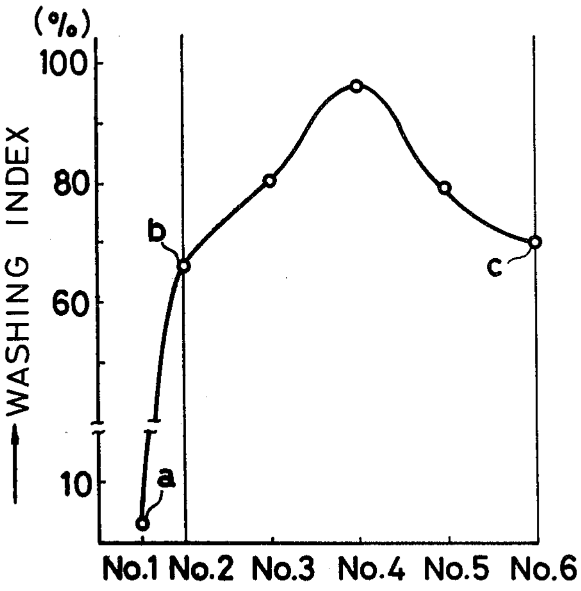
FIGS. 1–5 are graphs showing the washing indices of the detergent compositions of the present invention in comparison with similar detergent compositions used as control.

As a result of our extensive researches made to overcome the problem of toxicity as found in phosphate-type detergents and to develop a detergent composition improved in performance, economical factor and minimized in environmental hazard as well, it has now been found that when a mixture of an imido-bis-sulfate and an aluminosilicate is incorporated as a builder mixture into a surfactant, the mixture shows a synergistic builder-effect thereby to provide a detergent composition with low toxicity and high washing power. The present invention has been accomplished on the basis of the above finding.

The detergent composition of the present invention comprises (a) at least one surfactant selected from the group consisting of anionic surfactants and nonionic surfactants and builders of (b) an imido-bis-sulfate of the general formula:

$$(MSO_3)_2NM' \quad (I)$$

wherein M represents a cation selected from the group consisting of sodium, potassium, lithium and ammonium and M' represents a cation selected from the group consisting of hydrogen, sodium, potassium, lithium and ammonium and (c) an aluminosilicate of the general formula:

$$(M''_nO)_xAl_2O_3(SiO_2)_y \quad (II)$$

wherein M'' represents a cation exchangeable with calcium ion, n is a number determined according to the valency of M'', x is a number of 0.5–2.0 and y is a number of 0.5–8.

The detergent composition of this invention comprising (a) an anionic and/or nonionic surfactant having incorporated thereinto (b) the imido-bis-sulfate and (c) the aluminosilicate is remarkably enhanced in the washing power thereof by virtue of a synergistic builder effect of the ingredients (b) and (c) so that when a new detergent which is equivalent in efficiency to the conventional detergent is obtained, there is necessity of incorporating no or a little amount of a phosphate into the new detergent. As the builders are cheap, an economical effect is achieved in addition to solution of the problem of minimizing toxicity, thus attaining noticeable technical advantages.

The imido-bis-sulfate (b) of the general formula I, one of the indispensable ingredients of the detergent composition of this invention, which can be produced easily from sulfur and ammonia as starting materials and is also obtainable by the treatment of $NO_x$ exhaust, is very cheap and superior in effective utilization of sulfur as this ingredient has a very high content of sulfur as compared with Glauber's salt having about 10% of sulfur.

This compound has a structure free of phosphorus which participates in the problem of making waste water nutritive, and is of very low nitrogen content in the case of an alkali metal salt.

An aqueous solution of this compound is neutral or weakly alkaline and is kept in a desirable pH range for builders. This compound has a sufficient water-solubility regarded as an indispensable factor for builders. For example, sodium triphosphate shows a pH of 9.7 (1% solution), a water solubility of 14.5 g/100 g water (at 25° C.) or 23.25 g/100 g water (at 80° C.), a phosphorus content of 25.3% and a nitrogen content of 0% while trisodium imido-bis-sulfate monohydrate shows a pH of 10.9, a water solubility at 19.7 g/100 g of water (at 30° C.) or 68.8 g/100 g water (at 40° C.), a phosphorus content of 0% and a nitrogen content of 5.4%.

Subsidiary indispensable properties of builders for powdery detergents include crystallinity, powder stability, fluidity, granule-forming property and resistance to agglomeration. Imido-bis-sulfates are generally satisfactory in these properties. In recent years, low toxicity is one of the increasing severe requirements for builders.

Most of the builder candidate substances studied or proposed in the prior art as exhibiting a high level of performance is unsatisfactory in respect of toxicity (skin irritation, oral toxcity, toxicity to fishes. However, the imido-bis-sulfates show extremely low levels of acute oral toxicity, skin irritation, toxicity to fishes and hemolysis and have very high practical values.

Illustrative of the imido-bis-sulfate are, for example, those of neutral property such as $(NH_4SO_3)_2NH$ and $(NaSO_3)_2NH.\ 2H_2O$ and those of basic property such as $(NH_4SO_3)_2NNH_4.\ H_2O$, $(NaSO_3)_2NNa.\ H_2O$ and $(NaSO_3)_2NNa\ .\ 12H_2O$.

In the aluminosilicates of the general formula II, M stands for a cation replaceable with calcium ion, such as sodium, potassium, lithium or ammonium ion, n is 2 when M'' is monovalent or 1 when M'' is bivalent, x is within the range of 0.5–2.0, preferably 1.2–4.0 and y is within the range of 0.5–8.0, preferably 1.2–4.0. This aluminosilicate is an anhydrous active substance having a calcium-combining capacity of at least 50 mg CaO/g and is in the form of water-insoluble fine particles.

The aluminosilicate may have a calcium-combining capacity as high as 200 mg CaO/g but preferably has a calcium-combining capacity of 100–200 mg/CaO/g.

The cation M'' is typically sodium ion but includes such cations as lithium, potassium, ammonium and ions. Also included in M'' are cations of water soluble organic bases such as primary, secondary and tertiary amines and alkylolamines.

The aluminosilicates used in this invention can be prepared, for example, by reacting a water-soluble silicate with a water-soluble aluminate in the presence of water. This reaction is carried out converniently by mixing aqueous solutions of the starting materials each other or by mixing one reactant in solid state with an aqueous solution of the other reactant. It is also possible to knead both reactants in solid state in the presence of water for obtaining the desired aluminosilicate. The method of preparation, reaction conditions therefor and properties of the aluminosilicates are disclosed in detail in Japanese Patent Prov. Publn. No. 50-37804.

The aluminosilicate used in the invention is pulverized as fine as possible because it is desired to have a large effective surface area and good dispersibility into water. The use of the aluminosilicate having a particle diameter within the range of 0.05–30 $\mu$, preferably 0.1–10 $\mu$is suitable for the present invention. The aluminosilicate is advantageous for practical use in that it is cheap and superior in safety.

Illustrative of the anionic surfactant utilizable in the composition of this invention are conventional ones such as sodium alkylsulfate, sodium alkylbenzenesulfonate, sodium long chain $\alpha$-olefinsulfonate and alkylpolyoxyalkylene ether sulfate. These surfactant may be used solely or as mixture. Illustrative of the nonionic surfactant are conventional ones such as polyoxyethylenealkyl ethers, polyoxyethylene esters of long chain fatty acids, polyoxyethylene-polypropylene block copolymers, polyoxyethylene nonylphenyl ether and alkylolamides of long chain fatty acids. These surfactants can conveniently be used singly or as mixture or may be used jointly with anionic surfactants.

The individual ingredients in the detergent composition of this invention are blended preferably in such proportion that the total amount of the imido-bis-sulfate and the aluminosilicate is 50–950 parts by weight, especially 200–500 parts by weight per 100 parts by weight of the surfactant. On the other hand, the mixing ratio of the imido-bis-sulfate to the aluminosilicate is preferably such that the quantity of the aluminosilicate is 10–80% by weight, especially 20–70% by weight while the quantity of the imido-bis-sulfate is 90–20% by weight, especially 80–30% by weight of the total quantity of both ingredients.

According to a preferable embodiment of this invention, there is provided a detergent composition remarkably improved in stability which is entirely free of a phosphate or has a lower phosphate content than the existing phosphate-type detergents but is equivalent or superior in performance to the existing detergents. In accordance with this invention, there is provided, for example, a detergent composition comprising a mixture containing 5–40% by weight, preferably 10–30% by weight of the surfactant, 3–50% by weight, preferably 5–30% by weight of the aluminosilicate and the balance of the imido-bis-sulfate.

The detergent composition of the present invention may be incorporated, in addition to the builders (b) and (c), with an auxiliary builder (d) in such an amount that the object of the present invention is not disturbed. In such case, the detergent composition may be incorporated with an auxiliary builder in an amount of 5–60% by weight, preferably 10–30% by weight based on the total amount of the composition containing the ingredients (a), (b), (c) and (d). Examples of such auxiliary builder (d) include carbonates, silicates and sulfates.

The detergent composition of the present invention is economically advantageous and displays a high level of washing power by virtue of a synergistic builder effect of the imido-bis-sulfate and the aluminosilicate used therein, as compared with a similar detergent composition wherein either one of the imido-bis-sulfate and the aluminosilicate is used. The detergent composition of this invention serves to minimize the amount of phosphorus which is regarded as one of the sources for making waste water nutrient, thus reducing the influence on environment and solving the problem on safety. Consequently, the detergent composition of the present invention has a very high practical value.

The detergent composition of the present invention may be incorporated with various conventional additives at need and can be supplied in a variety of forms such as a powdery preparation and a liquid preparation.

The present invention will now be illustrated in more detail by way of examples.

EXAMPLE 1 (Toxicity test)

The following 4 kinds of toxicity test were performed by trisodium imido-bis-sulfate which is a main ingredient of the builders used in the detergent composition of this invention.

Methods for the test:

(1) Sub-acute oral toxicity

Rats were forced to receive, once a day, oral administration of the test compound in a dose up to 1.8 g/kg at the maximum (a technically critical amount for a long-term administration). After the lapse of one-month test period, a general living condition of the rats thus treated was observed and, on the other hand, the measurement of gymnastic factors, the measurement of the composition of blood, chemical analysis of blood plasma and weighing and a histological investigation of internal organs were performed.

(2) Skin irritation

Using rabbits, a skin irritation test was performed in accordance with the improved Draze method (Federal Begister 37, 27635, 1972). A patch onto which a 7% aqueous solution of the test compound had been applied was put on the dorsum skin of the rabbit in such manner that the surface of the patch onto which the aqueous solution had been applied was brought into contact with the skin. The extent of irritation was observed for 3 days and a primary irritation rate was calculated.

(3) Hemolysis

A hemolytic effect of the test compound on the blood of a rabbit were examined after the lapse of one hour from oral administration of the test compound.

(4) Toxicity to fishes

The value of TLm (half lethal concentration) was measured using killifish approximately in accordance with the method of JIS K0102.

Results of the tests:

(1) Sub-acute oral toxicity

A noticeable change was not observed in general living conditions, except that a slight increase was observed in body weight of male rats. No change was observed in biochemical investigations except that a weak tendency of decrease in calcium and of increase in inorganic phosphorus was observed in male rats. No change was also observed in the investigations of blood except that a slight decrease was found in MCHC. No change was observed in the weighing and pathological investigation of internal organs, except that only a slight increase was observed in the weight of kidneys.

In conclusion, no special physiological impediment was seen in the continuous oral administration test for one month. In the case of oral administration of an extremely large amount of the test compound, however, there may be a possibility of some influence of metabolism of minerals and/or water.

(2) Skin irritation

The primary irritation rate calculated as 0.17 in the case of using the test compound is almost equal to the value of 0.08 calculated in the case of using distilled water. No formation of scab was observed during this test. The extent of skin irritation is within the category of "very mild" and is thus evaluated to be very slight.

(3) Hemolysis

A partial hemolysis was observed at a concentration of 0.025%.

(4) Toxicity to fishes

The TLm values in 24 hours and 48 hours were 2,500 ppm and 1,450 ppm, respectively, thus showing a very low toxicity.

These results prove that trisodium imido-bis-sulfate is regarded to be a substance of very low toxicity in the quantity usually employed.

The result proving low toxicity were also obtained for imido-bis-sulfates other than trisodium imido-bis-sulfate; the TLm values (24 hours) to killifish were 1400 for triammonium imido-bis-sulfate, 100,000 for disodium imido-bis-sulfate and 8,400 ppm for diammonium imido-bis-sulfate.

EXAMPLE 2

Trisodium imido-bis-sulfate and sodium aluminosilicate were used together as builders and their builder effect was examined.

The properties of the sodium aluminosilicate used in this example and also in the subsequent examples are shown in the following table wherein the assay values (%) are those obtained for the dried salt (100° C.), the water absorption ratios (%) are those obtained in atmosphere of 20% humidity, the dehydration ratios (%) are those obtained by allowing the salts to stand at 110° C. for 2 hours and the quantities of gas adsorbed (ml/g) are those obtained at 25° C., 1 atm.

(1) Preparation of an artificially stained cloth (cotton cloth)

A cotton cloth was immersed for one minute in a staining bath comprised of 8 parts of an oil, 0.40–0.45 parts of carbon black and 800 parts of Perchlene (perchloroethylene) and then air-dried to make an artificially stained cloth. The oil used in this experiment was composed of 15 parts of oleic acid, 7.5 parts of palmitic acid, 7.5 parts of myristic acid, 15 parts of triolein, 15 parts of tripalmitin, 10 parts of cholesterol, 5 parts of squalene, 10 parts of liquid paraffin, 10 parts of cetyl alcohol and 5 parts of chloesterol palmitate (all parts being on weight basis).

TABLE 1

| Sample | Assay values (%) | | | Distribution of particle size (μ, %) | | | | Water absorp.* rate | Dehydration rate | Quantity of gas adsorbed (g) | |
|---|---|---|---|---|---|---|---|---|---|---|---|
| No. | $SiO_2$ | $Al_2O_3$ | $Na_2O$ | ~115 | 10~15 | 5~10 | ~5 | (%) | (%) | $N_2$ | $CO_2$ |
| A | 32.5 | 30.5 | 18.7 | 32.5 | 10.5 | 40.7 | 16.3 | — | 20.90 | 9.4 | 107.1 |
| B | — | — | — | — | — | — | — | 166 | 20.64 | 9.8 | 104.5 |

*absorp. = absorption

TABLE A

| | | |
|---|---|---|
| (a) | Sodium atraight chain alkylbenzenesulfonate (referred to hereinafter simply as LAS) | 0.04% |
| (b) | Trisodium imido-bis-sulfate (referred to hereinafter simply as TSIS) | 0.16% (total of (b) and (c)) |
| (c) | Sodium aluminosilicate (A) [referred to hereinafter simply as SAlSi (A)] | |

(2) Laundry test

Four sheets of the artificially stained cloth (dimension: 5×10 cm) prepared as above were placed in a washing bottle of 400 ml in capacity in which 10 steel balls of 6.5 mm in diameter had been placed. The composition of the detergent composition of this invention used in this experiment is shown in Table A. Using a launder-o-meter, the laundry test was performed under the conditions shown in Table below.

TABLE 2

| Laundry conditions | |
|---|---|
| Concentration of surfactant (a) | 0.04% |
| Concentration of builders (b) + (c) | 0.16% |
| Volume of liquid for washing | 100 ml |
| Temperature of water | 30° C. |
| Water | Tap water |
| Washing time | 10 min. |
| Bath ratio | 1:50 |
| Rinsing (with tap water) | 200 ml; 10 min. |

Method of calculation for obtaining washing efficiency (%) and washing index (%):

The washing power was calculated according to the following equation:

$$D = \frac{R - R_0}{R' - R_0} \times 100$$

wherein R stands for a reflectance of the test cloth after laundry, R' for a reflectance of the test cloth before staining and $R_o$ for a reflectance of the stained test cloth before laundry.

The reflectances were measured through a green filter. The washing index (%) is represented in terms of percentage of the actually measured washing efficiency to the washing efficiency obtained in a laundry test conducted under the same conditions using a standard detergent having a composition shown in Table 3 which is approximate to a practical one.

TABLE 3

| Composition of a standard detergent | |
|---|---|
| Ingredients | Proportion (% by weight) |
| LAS | 17 |
| STPP* | 20 |
| Sodium metasilicate | 5 |
| Sodium carbonate 3 | |
| Carboxymethylcellulose | 1 |
| Water | 10 |
| Glauber's salt | 44 |

Note:
STPP* means sodium tripolyphosphate

Result of the test

A result of the test is shown in FIG. 1. In the graph of FIG. 1, the reference numerals on the abscissa correspond to the samples (Nos. 1-6) having the compositions shown in Table 4 and the ordinate stands for washing index (%).

TABLE 4

| Ingredient | Composition of detergent (%) No. 1 | No. 2 | No. 3 | No. 4 | No. 5 | No. 6 |
|---|---|---|---|---|---|---|
| LAS | 0.04 | 0.04 | 0.04 | 0.04 | 0.04 | 0.04 |
| TSIS | 0 | 0.16 | 0.12 | 0.08 | 0.04 | 0 |
| SAlSi(A) | 0 | 0 | 0.04 | 0.08 | 0.12 | 0.16 |

In the graph of FIG. 1, the points a, b and c stand for the washing indices obtained in the cases of using LAS alone (Sample No. 1) TSIS alone as builder (Sample No. 2) and SAlSi(A) alone as builder (Sample No. 6), respectively. These samples show poor results as compared with the other samples involved in the scope of this invention.

EXAMPLE 3

Aqueous solutions of detergents were prepared by dissolving in water sodium polyoxyethylene primary alkyl ether sulfate (sodium sulfate of an adduct of 3 moles of ethylene oxide to a primary alcohol with 12–14 carbon atoms; referred to hereinafter simply as $SpC_{13}E_3S$) as surfactant, TSIS and SAlSi(A) in various proportions. Using these aqueous solutions, a laundry test was performed in the same manner as described in Example 2. A result of the test is shown in FIG. 2.

Figure 2:
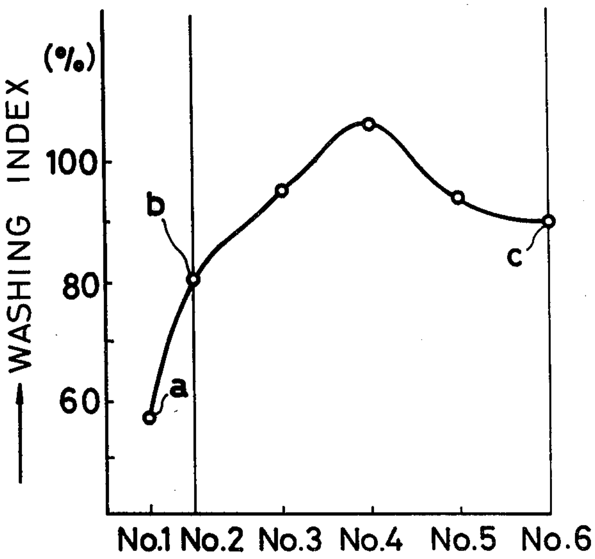

In the graph of FIG. 2, the reference numerals on the abscissa correspond to the samples (Nos. 1-6) shown in Table 5 below.

TABLE 5

| Ingredient | Composition of detergent (%) No. 1 | No. 2 | No. 3 | No. 4 | No. 5 | No. 6 |
|---|---|---|---|---|---|---|
| $SpC_{13}E_3S$ | 0.04 | 0.04 | 0.04 | 0.04 | 0.04 | 0.04 |
| TSIS | 0 | 0.16 | 0.12 | 0.08 | 0.04 | 0 |
| SAlSi(A) | 0 | 0 | 0.04 | 0.08 | 0.12 | 0.16 |

EXAMPLE 4

Aqueous solutions of detergents were prepared by dissolving in water $SpC_{13}E_3S$ as surfactant, TSIS and a different type of the aluminosilicate [referred to hereinafter simply as SAlSi(B)] in various proportions. This SAlSi(B) is marketed from Henkel (W. Germany), which has a chemical composition as tabulated below and was found to have an average particle size of 0.5–3 $\mu\phi$ by an electron microscopic observation.

| Chemical composition of SAlSi(B) | | | | | |
|---|---|---|---|---|---|
| $SiO_2$*1 | $Al_2O_3$*1 | $Na_2O$*2 | $Fe_2O_3$*2 | Weight*3 loss | Total content |
| 32.3 | 33.1 | 14.4 | 0.02 | 17.4 | 97.2 |

*1 Fluorescent X-ray analysis
*2 Atomic absorption analysis
*3 Loss of weight on ignition (400° C. 1 hour)

| PH characteristic of SAlSi(B) | | | |
|---|---|---|---|
| Water | Concentration (%) 0.5 | 1 | 5 |
| Ion exchanged water | 10.57 | 10.61 | 10.69 |
| Tap water | 10.37 | 10.59 | 10.79 |

Figure 3:
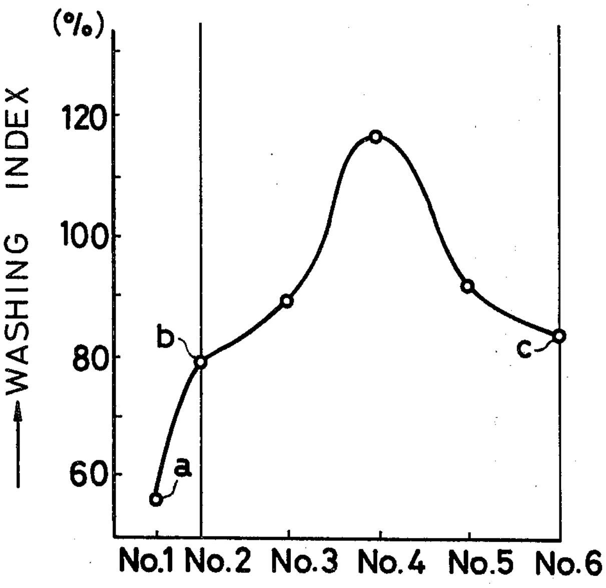

Using these aqueous solutions, a laundry test was performed in the same manner as described in Example 2. A result of the test is shown in FIG. 3. In the graph of FIG. 3, the reference numerals on the abscissa correspond to the samples (Nos. 1-6) having the composition shown in Table 6 below.

TABLE 6

| Ingredient | Composition of detergent (%) No. 1 | No. 2 | No. 3 | No. 4 | No. 5 | No. 6 |
|---|---|---|---|---|---|---|
| $SpC_{13}E_3S$ | 0.04 | 0.04 | 0.04 | 0.04 | 0.04 | 0.04 |
| TSIS | 0 | 0.16 | 0.12 | 0.08 | 0.04 | 0 |
| SAlSi(B) | 0 | 0 | 0.04 | 0.08 | 0.12 | 0.16 |

EXAMPLE 5

Figure 4:
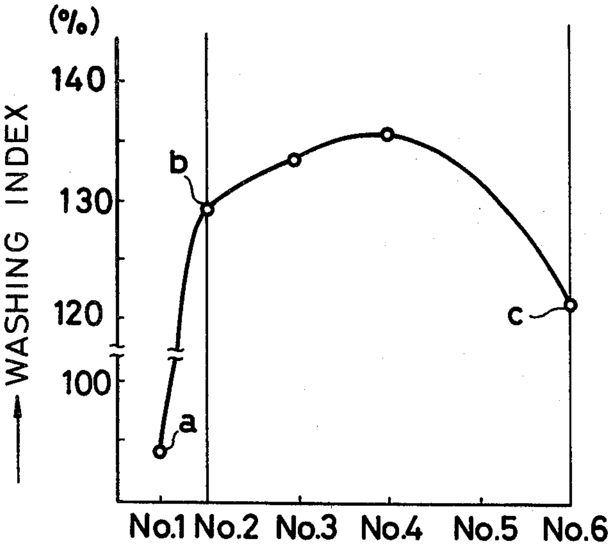

Aqueous solutions of detergents were prepared by dissolving in water polyoxyethylene primary alkyl ether (an adduct of 7 moles of ethylene oxide to a primary alcohol with 12–14 carbon atoms; referred to hereinafter simply as $C_{13}E_7$) as surfactant, TSIS and SAlSi(A) in various proportions. Using these aqueous solutions, a laundry test was performed in the same manner as described in Example 2. A result of the test is shown in FIG. 4. In the graph of FIG. 4, the reference numerals on the abscissa correspond to the samples (Nos. 1-6) having the compositions shown in Table 7.

TABLE 7

| | Composition of detergent (%) | | | | | |
|---|---|---|---|---|---|---|
| Ingredient | No. 1 | No. 2 | No. 3 | No. 4 | No. 5 | No. 6 |
| $C_{13}E_7$ | 0.04 | 0.04 | 0.04 | 0.04 | 0.04 | 0.04 |
| TSIS | 0 | 0.16 | 0.12 | 0.08 | 0.04 | 0 |
| SAlSi(A) | 0 | 0 | 0.04 | 0.08 | 0.12 | 0.16 |

EXAMPLE 6

Figure 5:
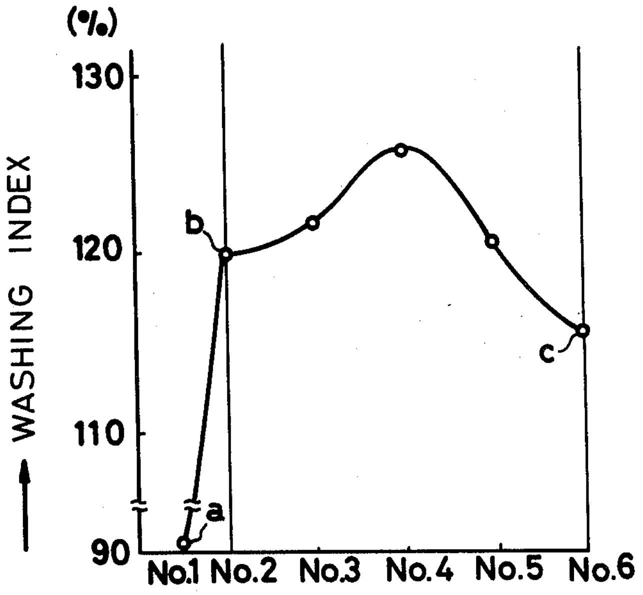

Aqueous solutions of detergents were prepared by dissolving in water polyoxyethylene secondary ether (an adduct of 9 moles of ethylene oxide to a secondary alcohol with 11-15 carbon atoms; referred to hereinafter simply as $C_{13}E_9$) as surfactant, TSIS and SAlSi(A) in various proportions. Using these aqueous solutions, a laundry test was performed in the same manner as described in Example 2. A result of the test is shown in FIG. 5. In the graph of FIG. 5, the reference numerals on the abscissa correspond to the samples (Nos. 1-6) having the compositions shown in Table 8.

TABLE 8

| | Composition of detergent (%) | | | | | |
|---|---|---|---|---|---|---|
| Ingredient | No. 1 | No. 2 | No. 3 | No. 4 | No. 5 | No. 6 |
| $C_{13}E_9$ | 0.04 | 0.04 | 0.04 | 0.04 | 0.04 | 0.04 |
| TSIS | 0 | 0.16 | 0.12 | 0.08 | 0.04 | 0 |
| SAlSi(A) | 0 | 0 | 0.04 | 0.08 | 0.12 | 0.16 |

As is evident from the results shown in FIGS. 1-5, the conjoint use of the imido-bis-sulfate with the aluminosilicate serves to enhance the washing power, thus exhibiting a remarkable synergistic builder effect.

As many apparently widely different embodiments of this invention may be made without departing from the spirit and scope thereof, it is to be construed that this invention is not limited to the specific embodiments illustrated in examples except as defined in the appended claims.

What is claimed is:

1. A detergent composition which consists of (A) a surfactant selected from the group consisting of anionic surfactants and non-ionic surfactants and (B) a builder, said builder being a mixture of (i) an imido-bis-sulfate of the general formula $(MSO_3)_2NM'$ wherein M represents a cation selected from the group consisting of sodium, potassium, lithium and ammonium and M' represents a cation selected from the group consisting of hydrogen, sodium, potassium, lithium and ammonium, and (ii) sodium aluminosilicate of 0.05-30 micron particle size of the general formula $(Na_2O)_xAl_2O_3\ (SiO_2)_y$ wherein the sodium is exchangeable with a calcium ion, x is a number within the range of 0.5-2.0 and y is a number within the range of 0.5-8, the total amount of said imido-bis-sulfate and said sodium aluminosilicate being 50-950 parts by weight per 100 parts by weight of said surfactant, said imido-bis-sulfate being 80-30 by weight percent based on the total amount of said imido-bis-sulfate and said sodium aluminosilicate, said sodium aluminosilicate being 20-70 by weight percent based on the total amount of said imido-bis-sulfate and said sodium aluminosilicate, said sodium aluminosilicate having at least 50 mg CaO/g of Ca-combining capacity and up to 200 mg CaO/g.

2. A detergent composition which consists of (A) a surfactant selected from the group consisting of anionic surfactants and non-ionic surfactants, (B) a builder which is a mixture of (i) an imido-bis-sulfate of the general formula $(MSO_3)_2NM'$ wherein M represents a cation selected from the group consisting of sodium, potassium, lithium and ammonium and M' represents a cation selected from the group consisting of hydrogen, sodium, potassium, lithium and ammonium, and (ii) sodium aluminosilicate of 0.05-30 micron particle size of the general formula $(Na_2O)_xAl_3(SiO_2)_y$ wherein the sodium is exchangeable with a calcium ion, x is a number within the range of 0.5-2.0 and y is a number within the range of 0.5-8, the total amount of said imido-bis-sulfate and said sodium aluminosilicate being 50-950 parts by weight per 100 parts by weight of said surfactant, said imido-bis-sulfate being 80-30 parts by weight percent based on the total amount of said imido-bis-sulfate and said sodium aluminosilicate, said sodium aluminosilicate being 20-70 by weight percent based on the total amount of said imido-bis-sulfate and said sodium aluminosilicate, said sodium aluminosilicate having at least 50 mg of CaO/g of Ca-combining capacity and up to 200 mg CaO/g, and (C) an auxiliary builder in an amount of 5-60 percent by weight based on the total amount of said surfactant, said imido-bis-sulfate, said sodium aluminosilicate and said auxiliary builder.

* * * * *